(12) United States Patent
Urban et al.

(10) Patent No.: US 7,080,480 B2
(45) Date of Patent: Jul. 25, 2006

(54) INTEGRATED TREE ROOT AND STORM WATER SYSTEM

(75) Inventors: James Urban, Annapolis, MD (US); Albert L. Key, New York, NY (US); Charles Julian Ray, San Francisco, CA (US); Charles Graham Ray, San Francisco, CA (US); Michael James, Vancouver (CA)

(73) Assignee: Urban Root L.L.C., San Francisco, CA (US)

( * ) Notice: Subject to any disclaimer, the term of this patent is extended or adjusted under 35 U.S.C. 154(b) by 0 days.

(21) Appl. No.: 10/759,493

(22) Filed: Jan. 15, 2004

(65) Prior Publication Data

US 2005/0155285 A1    Jul. 21, 2005

(51) Int. Cl.
A01G 29/00    (2006.01)
A01G 9/00    (2006.01)
E21F 17/16    (2006.01)
E02B 11/00    (2006.01)

(52) U.S. Cl. .................. 47/48.5; 405/53; 405/43; 210/170; 47/32.7; 47/79; 47/1.01 F

(58) Field of Classification Search .......... 47/32.7, 47/1.01 F, 1.01 T, 32, 76, 32.3, 79, 32.8, 47/65.9, 48.5, 21.1; 405/43–46, 50, 53, 59
See application file for complete search history.

(56) References Cited

U.S. PATENT DOCUMENTS

| | | | |
|---|---|---|---|
| 4,771,572 A * | 9/1988 | Higa | 47/58.1 R |
| 4,982,533 A | 1/1991 | Florence | |
| 4,983,069 A | 1/1991 | Florence | |
| 5,086,594 A | 2/1992 | Florence | |
| 5,131,196 A | 7/1992 | Florence | |
| 5,195,284 A | 3/1993 | Florence | |
| 5,249,885 A | 10/1993 | Florence | |
| 5,322,629 A * | 6/1994 | Stewart | 210/767 |
| 5,383,302 A * | 1/1995 | Hill | 47/78 |
| 5,460,867 A * | 10/1995 | Magnuson et al. | 428/178 |
| 5,810,510 A * | 9/1998 | Urriola | 405/45 |
| 6,095,718 A * | 8/2000 | Bohnhoff | 405/52 |
| 6,237,283 B1 * | 5/2001 | Nalbandian et al. | 47/48.5 |
| 6,277,274 B1 * | 8/2001 | Coffman | 210/150 |
| 6,428,870 B1 * | 8/2002 | Bohnhoff | 428/44 |
| 6,540,436 B1 * | 4/2003 | Ogi | 405/45 |
| 6,569,321 B1 * | 5/2003 | Coffman | 210/150 |
| 6,779,946 B1 * | 8/2004 | Urriola et al. | 405/43 |
| 2001/0045383 A1 * | 11/2001 | Coffman | 210/150 |
| 2002/0179509 A1 * | 12/2002 | Wofford | 210/151 |
| 2003/0082359 A1 * | 5/2003 | Scott | 428/221 |
| 2004/0076473 A1 * | 4/2004 | Burkhart | 405/36 |

FOREIGN PATENT DOCUMENTS

| | | | | |
|---|---|---|---|---|
| JP | 02161008 A | * | 6/1990 | |
| JP | 04099411 A | * | 3/1992 | |

* cited by examiner

*Primary Examiner*—Andrea M. Valenti
(74) *Attorney, Agent, or Firm*—DLA Piper Rudnick Gray Cary US LLP

(57) ABSTRACT

A structural cell system is disclosed for supporting hardscape areas in a way that enables tree root growth and accommodates filtering, retention, storage and infiltration of storm water while preventing hardscape damage. The system includes a plurality of structural cells capable of being positioned below a hardscape. The structural cells are designed to have openings that are sized to accept tree roots. The system has one or more permeable barriers around the structural cells with a way for water to flow into the plurality of structural cells flow out of the structural cells.

21 Claims, 13 Drawing Sheets

INTEGRATED TREE ROOT AND STORM WATER SYSTEM

BACKGROUND OF THE INVENTION

1. Field of the Invention

This disclosure relates generally to a system for the management of tree roots and storm water runoff in urban areas, and more particularly to integrated cells used in a structural system for supporting sidewalks and other paved areas that enables tree root growth and accommodates filtering, retention, storage and infiltration of storm water while preventing hardscape damage.

2. Background Information

The dollar value of urban trees can be difficult to assess but there is an intrinsic value to urban trees that is widely recognized. Growing large healthy trees is very difficult in urban areas and in order to successfully grow large trees they must be provided with sufficient high quality soil with adequate moisture and sufficient soil drainage. This becomes increasingly difficult as the area devoted to human needs increases, causing a decrease in the area that can be devoted to providing soil for trees. Attempts to solve the problem of reduced space have resulted in solutions that are expensive, only meet a portion of the goals, address limited volumes of soil, and/or have high maintenance cost.

As urban areas become increasingly dense, open space is at a premium and it becomes increasingly difficult to find enough open space to grow trees and to control storm water runoff. Commonly in urban areas, trees are positioned in vertical openings in the sidewalk or roadway. As the trees grow, the roots extend under the sidewalk or roadway and create conflict, making the sidewalk or roadway hazardous or unsightly. When this occurs, the tree and/or hardscape are usually removed. The sidewalk must rest on compacted soils which impede the growth of tree roots. A solution to these problems is to make areas of low compacted soils under the pavement, suitable for root growth, that are in a structural environment suitable to support the paving above.

Controlling storm water run off is another problem in urban areas. Successful control of storm water should 1) slow the rate of runoff, 2) reduce the volume of runoff and 3) filter the runoff water including removing trash, large particles and chemicals, 4) allow excess storm water into the storm drains and 5) retain and infiltrate it into the ground. As density increases it becomes more difficult to attain these goals. The areas that can be devoted to storm water management decrease because of paving or buildings. In the design of storm water treatment systems, more and smaller components, called a treatment train, is generally considered a better design than one that relies on a few larger treatment facilities. It has further been acknowledged that keeping the water in the ground and out of treatment system pipes and other structures produces better results with less maintenance. Keeping water out of the treatment system pipes also keeps the water at a higher elevation for a longer period of time. This slows the water down and maintains the widest range of options to develop alternative strategies for further treatment. Attempts to solve the problem of reduced space have resulted in solutions that are expensive, rely on a single large treatment facility, only meet a portion of the goals, treat limited volumes of water, and/or have high maintenance cost.

There are many solutions for providing some aspects of storm water management within and under pavements, many of them listed on the Environmental Protection Agency web site (http://www.epa.gov/region1/assistance/ceitts/stormwater/techs.html). These systems filter trash and large particles, or filter chemicals, or store water or allow for infiltration, but none accomplish all four tasks. They are often large structures that do not develop a treatment train and have significant maintenance requirements. They often require large dedicated spaces that are not compatible with other urban infrastructure where there is a high degree of complexity and competition for space between utility systems. None of these systems accommodate rooting space for trees.

What is needed is a system that accommodates the requirements for both tree rooting and storm water management functions listed above.

SUMMARY

This invention will allow the same space within the city infrastructure to accommodate both significant storm water management and tree root development.

In one embodiment a structural cell system is disclosed for supporting hardscape areas that enables tree root growth and accommodates filtering, retention, storage and infiltration of storm water while preventing hardscape damage. The system includes a plurality of structural cells capable of being positioned below a hardscape, the structural cells having openings sized to accept tree roots and one or more permeable barriers around the structural cells. There is also a way for water to flow into and out of the plurality of structural cells.

In another embodiment a multilayered structural cell system is disclosed for supporting hardscape areas that enables tree root growth and accommodates filtering, retention, storage and infiltration of storm water while preventing hardscape damage. The system includes a first layer of structural cells for short-term water storage positioned below the hardscape and being capable of short-term water storage. A second layer of structural cells positioned below the first layer, the second layer of structural cells being capable of storing tree-rooting medium supporting the growth of tree roots. A third layer of cell structure positioned below the second layer, the third layer of structural cells being capable of long-term water storage. There is also a way for water to flow into the first layer and out of the third layer. With a first permeable barrier separating the first and second layer, a second permeable barrier separating the second and third layers and each of the layers being in fluid communication with the other layers.

BRIEF DESCRIPTION OF THE DRAWINGS

The following detailed description of the invention reference is made to the accompanying drawings which form a part hereof, and in which are shown, by way of illustration, specific embodiments in which the invention may be practiced. These embodiments are described in sufficient detail to enable those skilled in the art to practice the invention. Other embodiments may be utilized, and structural, logical, and electrical changes may be made, without departing from the scope of the present invention.

DETAILED DESCRIPTION

Figure 1:
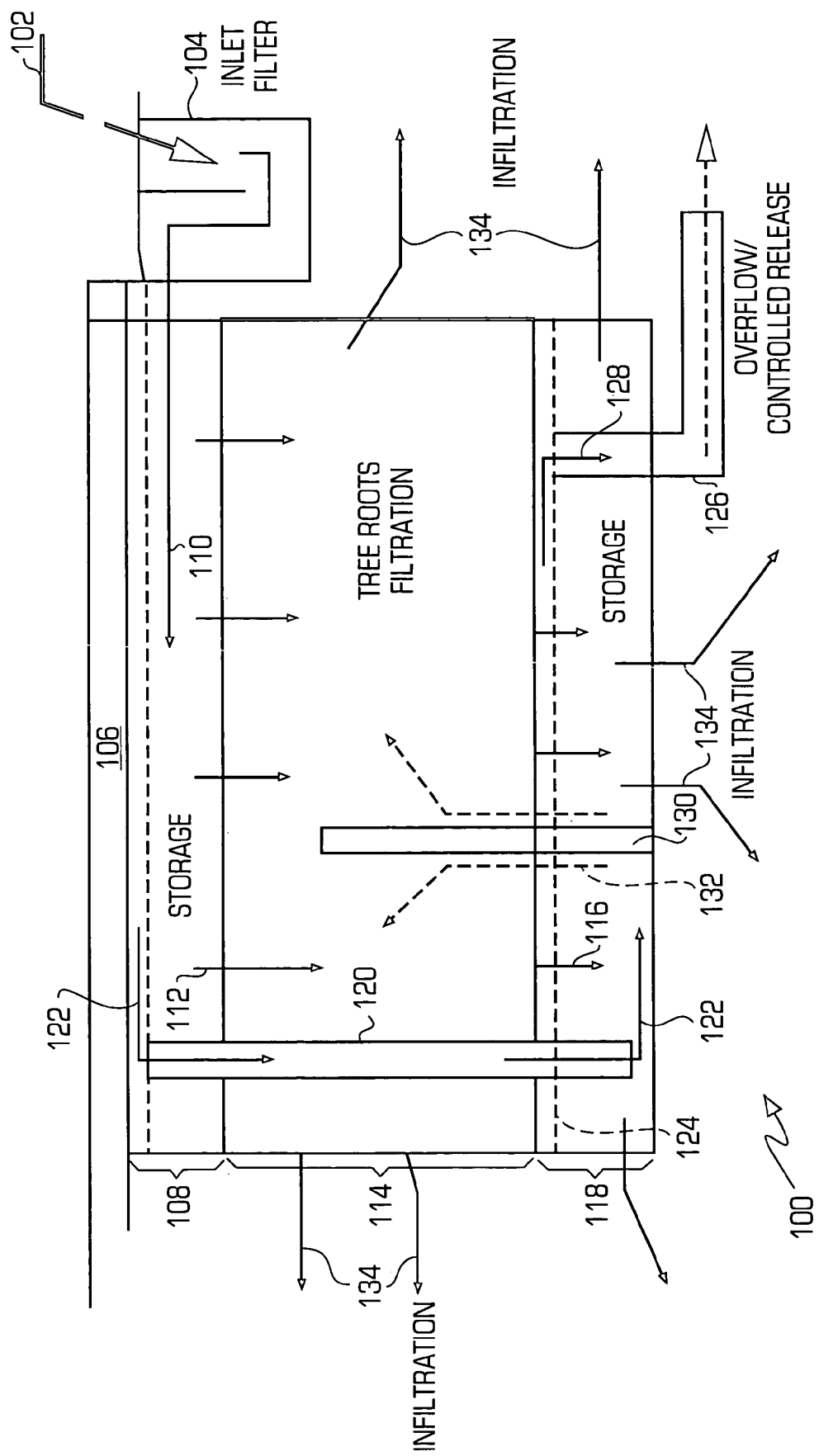
FIG. 1 shows the flow of water through one embodiment of the invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

In the following description, numerous specific details are provided, such as the identification of various system components, to provide an understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Reference throughout this specification to "tree roots" or "roots" is used. One skilled in the art will recognize that embodiments of the invention should not be limited to these terms and that the terms are used as a general term for any root for a tree, plant or other vegetation that would benefit from the described invention.

As an overview, one embodiment the invention is disclosed for an integrated tree root and storm water system that is designed to allow for tree root growth and the interception, filtering and storage of storm water. The stored water enters the system and may be filtered through a tree-rooting medium or soil. The water may also be infiltrated into the adjacent soil, or wicked back into tree rooting soil for use by the trees at a later time, or allowed to runoff into a piped storm water system at a controlled rate. The integrated tree root and storm water system further allows for the growth of tree roots into the system so that large healthy urban trees, such as those near a street or sidewalk, may be grown utilizing some of the storm water. A series of geo textiles and membranes will be utilized in various locations to perform filtration of particulate. Cation exchange within the soil will provide chemical stabilization using biological processes within the soil. The system may also be flushed with water to remove accumulated sediment or chemical out of the system.

The integrated tree root and storm water system is designed to be installed under hardscape, such as sidewalk, parking or roadway pavement, to permit the efficient use of land area for the movement of people and vehicles. The system may also be used under permeable hardscapes, such as turf, planting beds or compacted soil. The system is designed such that the tree roots may grow within the system such that conflicts between the roots and the paving will be greatly reduced. The roots may also extend through the system and access soil beyond the system, increasing the soil volume accessible by the roots. The integrated tree root and storm water system is designed to permit it to be utilized in small units to accommodate the complex nature of subsurface urban areas where there is significant competition for spatial resources. The system is modular in design, which permits the flexibility needed to respond to changes in grade, alignment and interference with utility facilities in complex urban environments. The flexibility of the system allows the development of interlinked treatment areas that provides redundancy and the dispersal of storage and infiltration functions. This redundancy and dispersal creates a system that is less likely to fail due to clogging or saturation of adjacent soil areas.

The integrated tree root and storm water system contains multiple three-dimensional structural cells that are joined together. The structural cells are strong enough to withstand design vehicle loading, maintain an open structure that can be filled with loam soil, and permit tree roots to grow within the cell in both the horizontal and vertical axis. The structural cell can accommodate the storage and movement of water. The structural cells may be layered to create different functional zones within the system.

The integrated tree root and storm water system may:
Remove trash and large debris
Filter sands, sediments and small size particles
Filter chemicals including hydro carbons, nitrates, heavy metals, others
Slow down water velocity and retain water on the site for slow release
Infiltrate water into the ground or return to the atmosphere
Cool the water temperature
The system is designed to be:
Cost efficient
Low maintenance (once a year at a minimum)
Compatible with other urban infrastructure
Simple to construct
Small and flexible in size and capable of creating many treatment features within a landscape
Keep water close to the surface
Provide treatment of a storm's first flush of water while still accommodating large storm events
Provide the majority of the system under the pavement FIG. 1 is a cross-sectional schematic showing one embodiment of an integrated tree root and storm water system 100. In use, water 102, such as storm water or runoff, enters the system 100 by being collected in a storm or curb inlet or drain 104. The inlet 104 may be designed to pretreat the water to remove trash and debris including small particles of soil prior to entering the system. In some cases, the hardscape 106 above the system 100 is permeable, such as turf or plating beds, that water can pass directly into the system 100. The pervious hardscape may then perform the function of filtering out the trash and soil particles.

An upper water cell layer 108 receives the filtered water 110. Some of the water 112 then begins to flow into a soil cell layer 114, which may be made of the same cell material as the water cell layer but filled with loamy soil. This soil cell layer 114 filters fine particles that were missed in the initial filter and immobilizes chemicals in the water through a process known as cation exchange. Biological process within the soil then processes these chemicals into stable compounds that remain in the soil or which may be taken up by the tree roots. Some of the water 116 percolates through the soil in the soil cell layer 114 and drains into a lower water cell layer 118. The upper water cell layer 108 is provided with a bypass splitter device 120 capable of transferring some of the water 122 directly from the upper water cell layer 108 to the lower water cell layer 118 when the storm flow rate exceeds the water flow rate through the middle soil cell layer 114. Filter cloth or geotextile 124 is placed between the bottom of the soil cell layer 114 and the lower water cell layer 118 to keep soil from settling into the lower water cell layer 118.

The lower water cell layer 118 is connected to a controlled overflow outlet 126 that slowly releases some of the water 128 out of the lower water cell layer 118 and keeps the system from remaining in a saturated state for long periods of time. Wick fabric material 130 connects the soil cell layer 114 to the lower water cell layer 118 such that the water 132 being stored in the lower water cell layer 118 can move up into the soil cell layer 114 to replenish water for the tree roots. Some of the water 134 may also exit the layers by infiltration into the surrounding soil or gravel. The invention may be modified by adding an impermeable geomembrane below or around some or all of the cell layers to eliminate the infiltration function when soil adjacent to the invention is not suitable to receive water or where the infiltration of water into subsoil may not be advisable.

Figure 2:
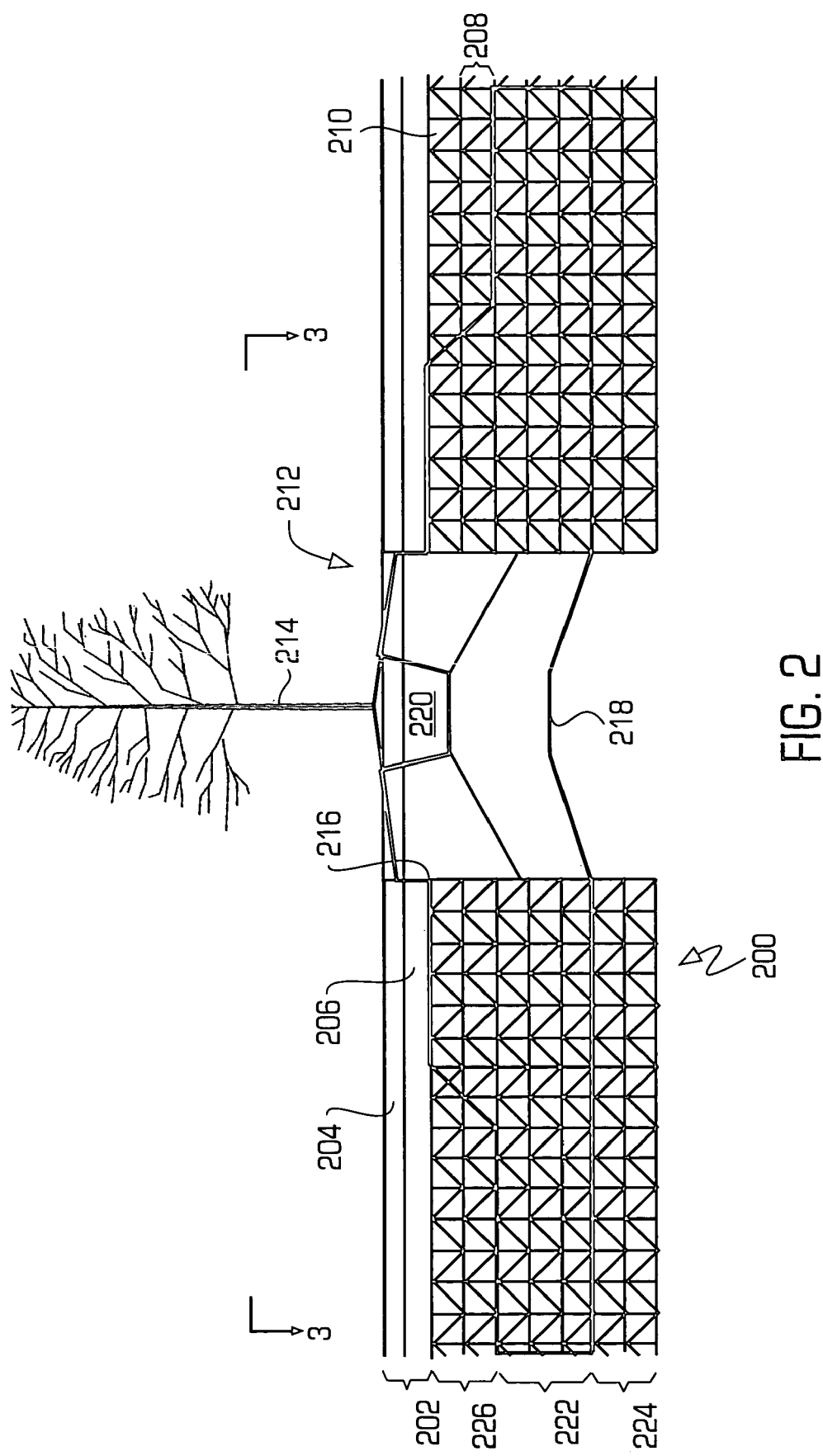
FIG. 2 shows a cross-sectional view of another embodiment of the invention.

FIG. 2 is a cross-sectional view showing another embodiment of an integrated tree root and storm water system 200 positioned below a hardscape 202, in this case a sidewalk or pavement 204 with a base material 206. Permeable hardscapes are also contemplated, such as turf, planting beds other types of covering. The system 200 may comprise one or more layers 208 of structural cells 210. The structural cells 210 are an open design having enough structural rigidity to be stacked and support the hardscape, while also having open space for water, soil or roots. The structural cells 210 may be made of concrete, composites, plastic and other suitable materials. The system 200 may be placed proximate openings 212 in the hardscape into which trees 214 are planted. In some embodiments root barriers 216 may be placed along the side of the opening 212 to guide the roots toward the structural cells 210 and keep them away from the hardscape 202. The shaded area 218 signifies the tree-rooting medium, for example loam or topsoil, into which the tree rootball 220 is placed.

As discussed above, the structural cells 210 are positioned in layers 208 There may be any number of layers 208 used in the system 200. Some of the structural cells may be filled with soil forming a soil cell layer 222 into which the tree roots, including structural roots, defined in the 2005 Glossary of Arboricultural Terms as "large woody, tree roots that anchor and support the trunk and crown; roots characterized by secondary thickening and relatively large diameter giving form to the root system and functioning in anchoring and supporting" may grow. The soil may be a low compacting soil tat remains in a low compacted state to promote tree root growth, including the growth of larger roots such as structural roots, into the cell. Other structural cells may be positioned below the soil cell layer 222, forming a lower water cell layer 224, which may be used for long term water storage. Still other structural water cells may be positioned above the soil cell layer 222, forming an upper water cell layer 226 which may be used for short-term water storage.

Figure 3:
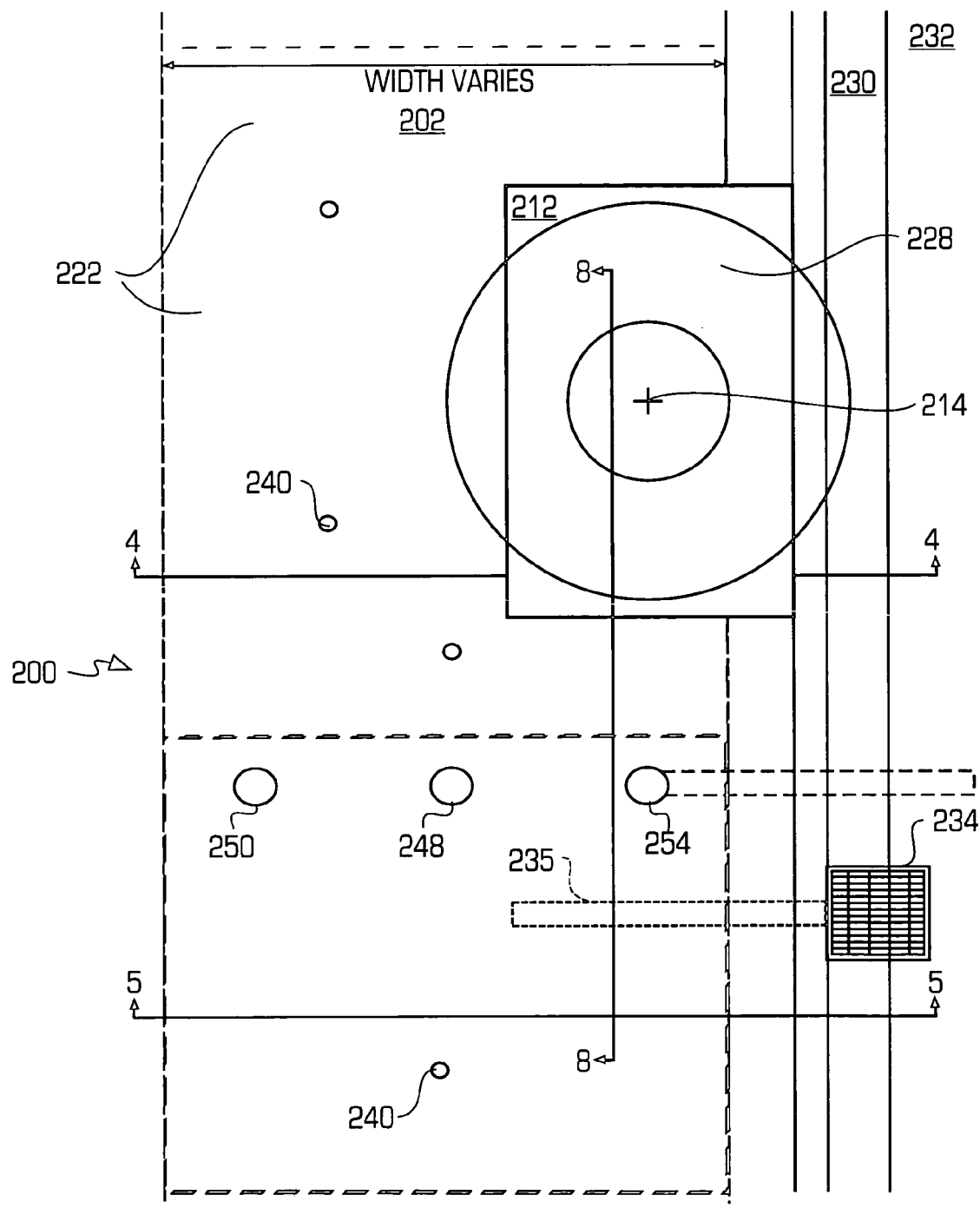
FIG. 3 shows a plan view of a portion of FIG. 2.

FIG. 3 is a plan view of a portion of FIG. 2, while FIGS. 4, 5A, 5B, 6 and 7 are cross-sectional views showing other embodiments. In the embodiment shown in FIGS. 3, 4 and 5A the tree 214 is positioned in a tree planting area 228 through an opening 212 in the hardscape 202. Adjacent the hardscape 202 is a curb and/or gutter 230, separating the hardscape 202 from a street 232. A curb inlet 234 is positioned in the curb 230 into which water may flow into the system 200. The curb inlet 234 may have a grating or a filter capable of filtering trash and large particles from the water prior to entering the system 200. The curb inlet 234 may be an existing inlet modified for filtering, or may be a specialty inlet, such as those sold be Carson Industries, designed to filter large and small particles and trash.

Figure 4:
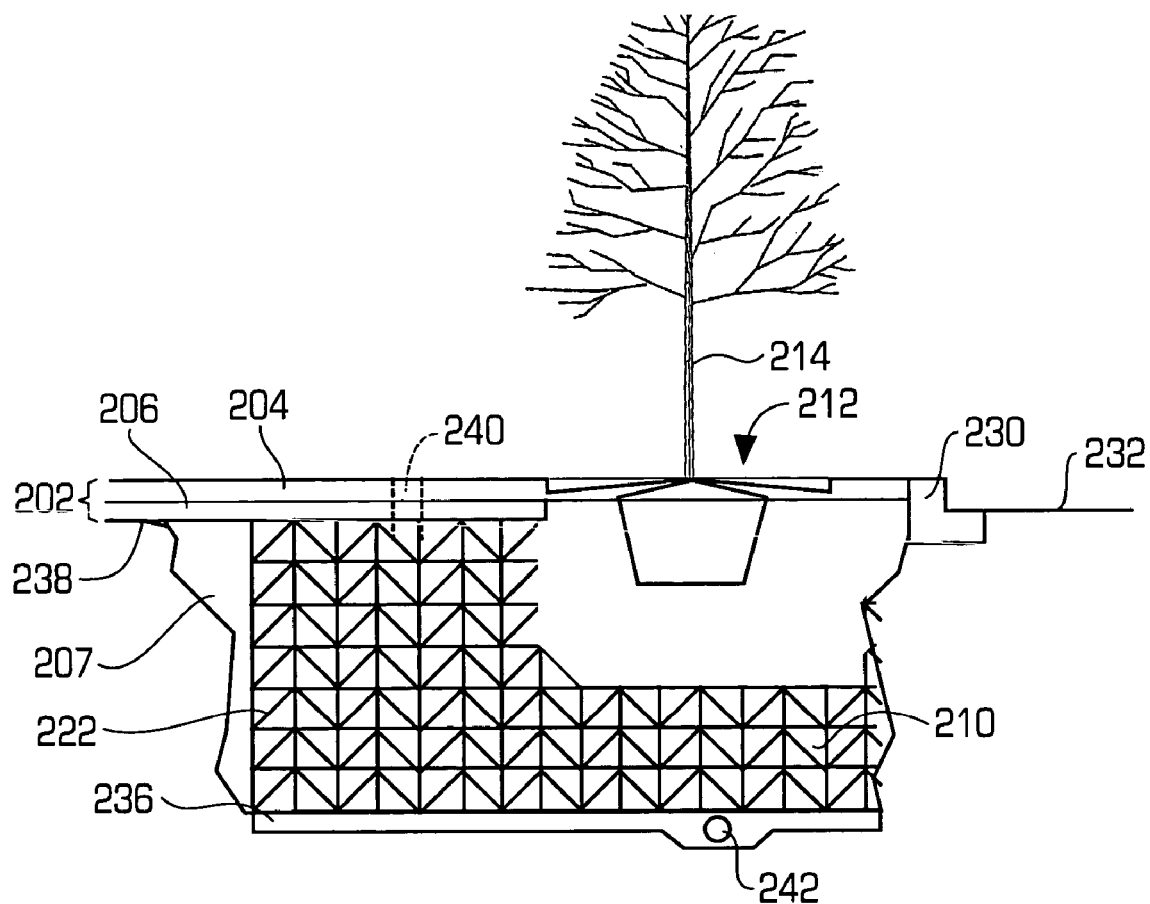
FIG. 4 is a cross-sectional view at line 4—4 in FIG. 3 showing soil cells at the tree planting area.

As shown in FIG. 4, the structural cells proximate the tree 214 may be filled with soil to support the root growth. While the structural cells 210 have been shown only under the hardscape 202, it is envisioned in other embodiments that they may also extend under the curb 230 and/or street 232. The structural cells 210 may be positioned upon a gravel drainage and/or leveling bed 236. Once the structural cells 210 are stacked, soil may be placed in them forming the soil cell layer 222. A layer of material, such as geotextile 238, may be placed upon the soil cell layer 222 for the hardscape 202 to be placed upon. In the embodiment shown, water, fertilizer, compost tea or other nutrients needed by the tree roots may be added to the soil through one or more soil injection ports 240. The soil may be placed in the structural cells 210 prior to the hardscape 202 placement. One or more drains 242 may be positioned in the gravel leveling bed 236 proximate the soil cell layer 222 and connected to a piped storm drain or to other discharge means.

Figure 5A:
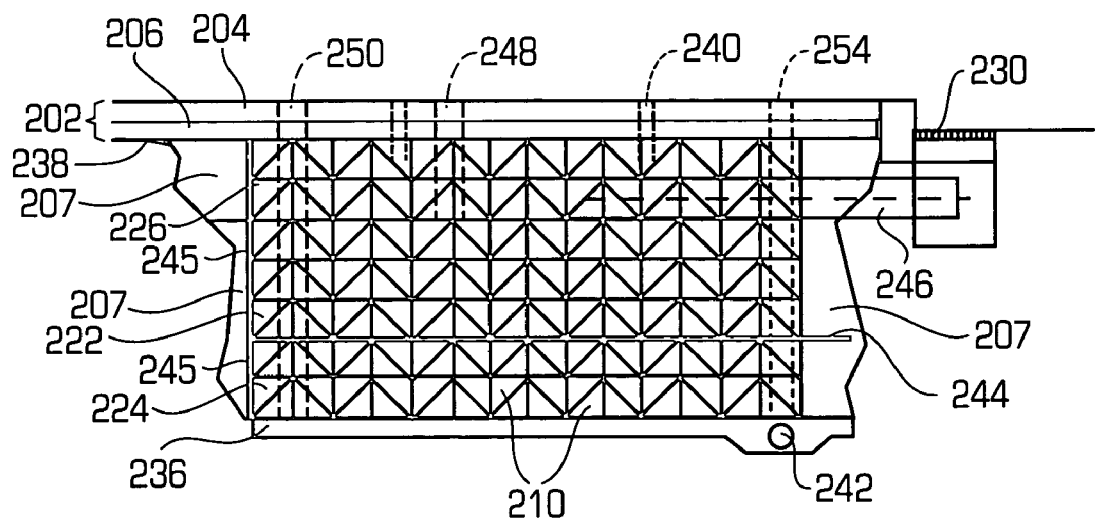
FIG. 5A is a cross-sectional view at line 5—5 in FIG. 3 showing one embodiment of vertically stacked water and soil cells.

Referring to FIG. 5A, the structural cells are shown stacked in three layers, an upper water cell layer 226 for short-term water storage, a soil cell layer 222 for tree rooting and water filtering, and a lower water cell layer 224 for long-term water storage and infiltration. A layer of geotextile 244 may be positioned between the soil cell layer 222 and the lower water cell layer 224 to prevent migration of the soil into the lower water cell layer 224. Surrounding the structural cells may be gravel fill and/or compact fill 207, such as loamy sand fill. A geotextile 245 may by placed around the water cell layers 224 and 226 to keep the gravel and/or soil out of the system. The curb inlet 230 may be connected to the upper water cell layer 336 by a connection pipe 246. For inspection and maintenance, there are also one or more upper cell inspection and cleanouts 248, lower cell inspection, cleanout and a bypass splitters 250, and over flow pipes 254. These pipes may also be used to control the rate of water flowing through the system.

Figure 5B:
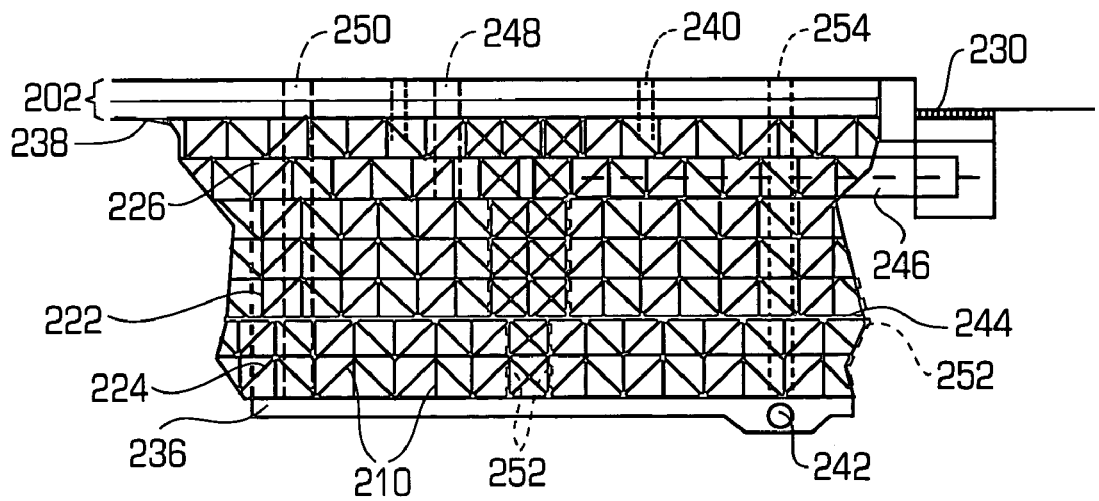
FIG. 5B is a cross-sectional view at line 5—5 in FIG. 3 showing another embodiment of corbelled stacked water and soil cells.

FIG. 5B is similar to FIG. 5A except in the way the structural cells are stacked. In the prior figures, the cells are shown stacked one on top of the other. It may be desirable to stack them a different way, such as corbel shown in FIG. 5B, in which the cells in each layer project slightly beyond the one below it. In other embodiments, the corbel might be inverted. In still other embodiments, the cells may be used to bridge, using corbelling techniques and inter-connecting devices between cells vertically and horizontally. Also shown in the figure are water wicks 252 that may be used to transfer water from the lower water cell layer 224 to the soil cell layer 222.

Figure 6:
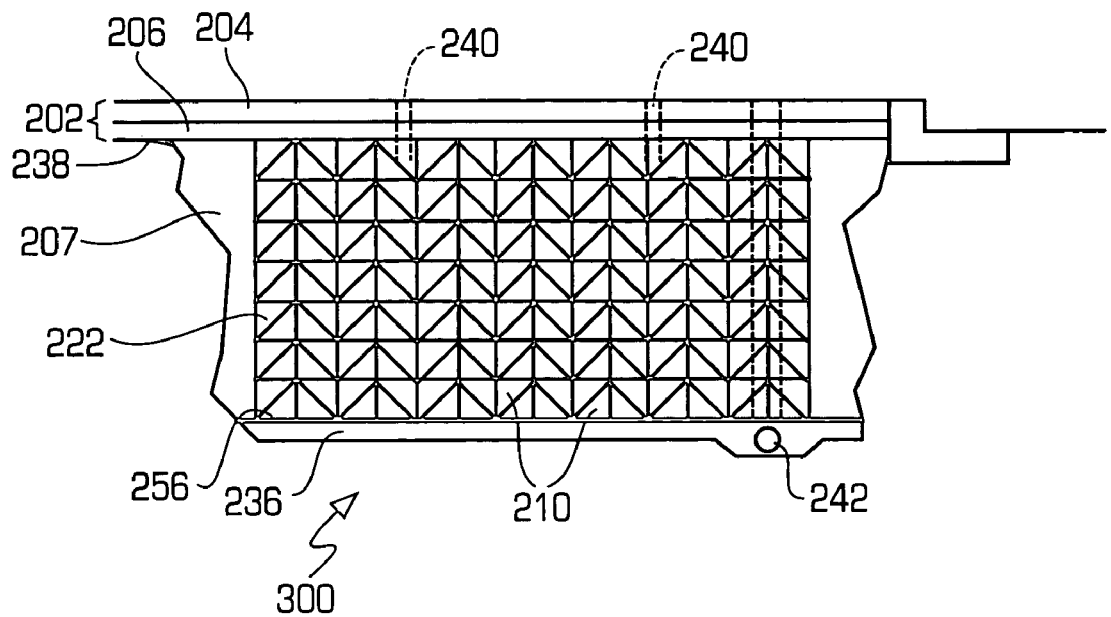
FIG. 6 is a cross-sectional view at line 5—5 in FIG. 3 showing an embodiment of stacked soil cells.

FIG. 6 is a cross-sectional view which shows another embodiment of an integrated tree root and storm water system 300 that may be utilized without the storm water function, using only loam soil filled structural cell soil layer 222 to provide a free-rooting function under the hardscape 202. When utilized in this manner, the structural cells provide a highly efficient rooting volume of loosely compacted loam soil that supports root growth, including the growth of larger roots such as structural roots, while still permitting pervious or non-pervious hardscape 202 to be installed on top of the cell system. Additional drainage pipes may also be installed under the soil filled cell in soils where the soil around the cell does not provide adequate drainage or infiltration.

Figure 7:
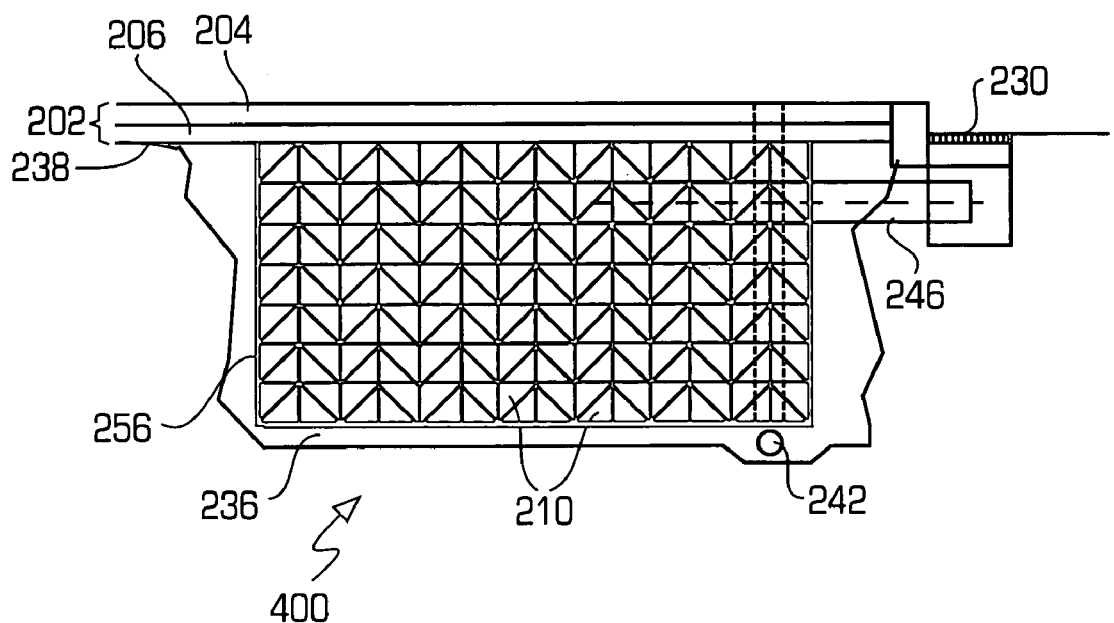
FIG. 7 is a cross-sectional view at line 5—5 in FIG. 3 showing an embodiment of stacked water cells.

In another embodiment of an integrated tree root and storm water system 400, shown in FIG. 7, the system may be utilized as a dedicated storm water storage system, with only a water cell layer below paved areas with no tree rooting cells, when provisions for tree roots are not required. In this embodiment the structural water cells may be provided with a controlled overflow at the top of the water cell layer and may or may not be provided with a controlled slow release outlet at the bottom. A controlled outlet at the bottom would only be eliminated in soils with adequate ability to receive infiltrated water from the cells at rates and volumes anticipated by the required storm events. There may also be a soil barrier 256 in granular or sandy soils to prevent soil from entering the cells and/or to allow compaction of the adjacent fill material.

In still another embodiment, the invention may eliminate the upper water cell layer and water may be piped directly into the lower water cell layer to be stored and wicked up to soil cell layer or slowly released or infiltrated into the surrounding soil or gravel. This embodiment would eliminate the fine filtering function of the soil cell layer.

Figure 8:
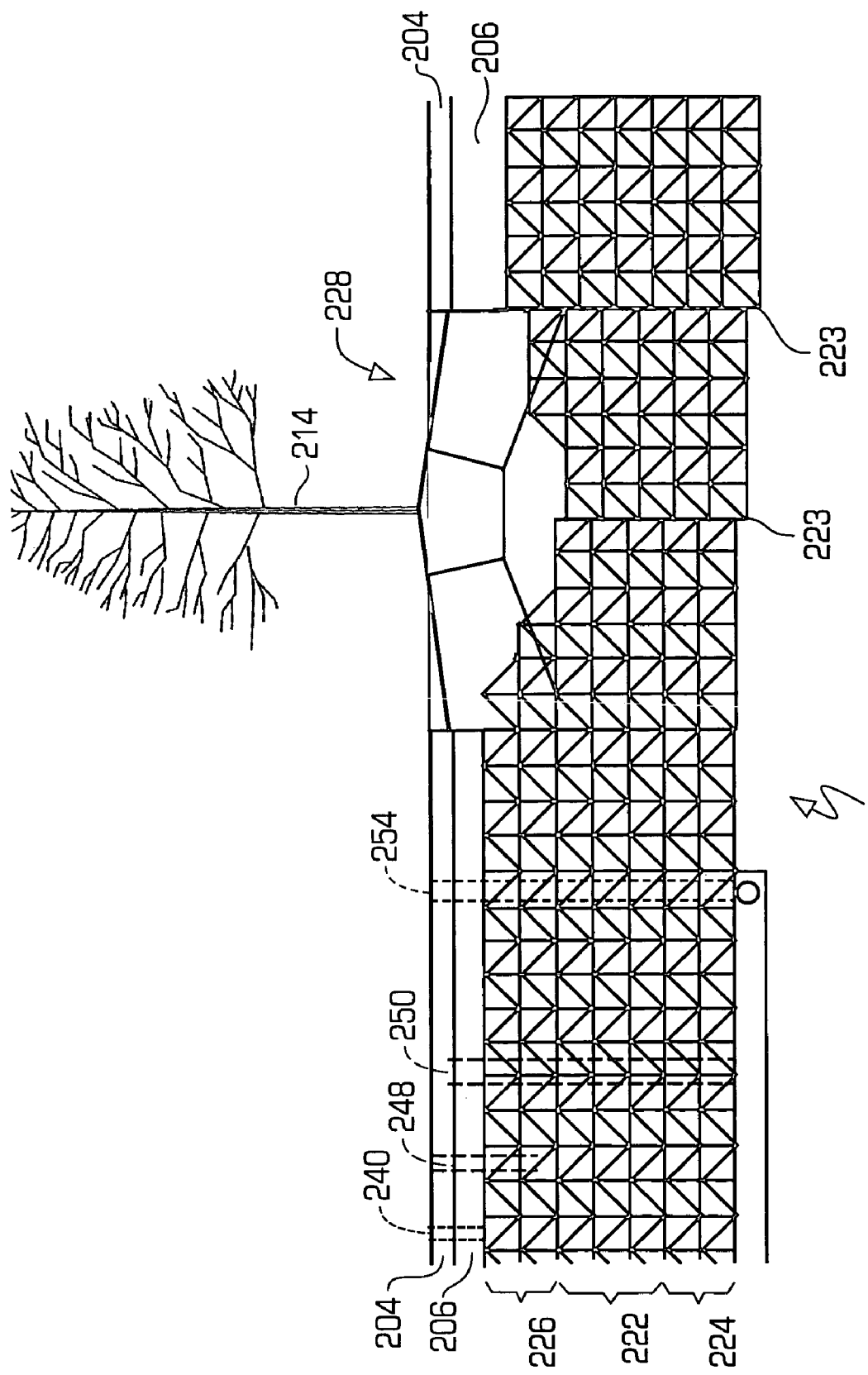
FIG. 8 is a cross-sectional view at line 8—8 in FIG. 3 showing one embodiment of water and soil cells.

Referring now to FIG. 8, the layers of structural cells may be modified as they approach the area 228 where the tree 214 is to be planted. In the embodiment shown, near the edge of the opening 228, the upper water cell layer 226 cells transition to cells filled with soil to maintain a dryer space around the tree planting area. The lower water cell layer 224 may continue near the edge of the tree opening but do not pass under the area where the tree 214 is to be planted. The lower water cell layer 224 cells may transition to soil cells and pass under the tree 214 (as shown in FIG. 8) or they may end with only soil under the tree 214 (as shown in FIG. 2). Soil cells may be used to allow an adjustment in the elevation of the tree 214 across the distance of the tree opening. Some advantages of placing structural cells beneath the tree planting area are that they may prevent the tree rootball from settling and allow for the establishment of deep tap roots, striker roots and deep fibrous roots immediately around the tree. Having soil cells the full depth allows for a change in grade 223 from cell group to cell group along the alignment of the system 200.

An important feature of the system 200 is functional access ports to maintain the health and function of the system 200. These include small access ports or soil injection ports 240 above the soil cells, spaced at approximately 4' on center, to allow the addition of water during drought periods, and or fertilizer or compost tea to maintain the health of the soil within the soil cell layer 222. These soil injection ports 240 can be included with or without the storm water management function and/or the tree rooting function. A set of larger ports are used for an upper cell inspection and cleanout 248 of the upper water cell layer 226, a lower cell inspection, cleanout and bypass splitter 250 of the lower water cell layer 224, and over flow pipe and inspection riser 254.

Figure 9:
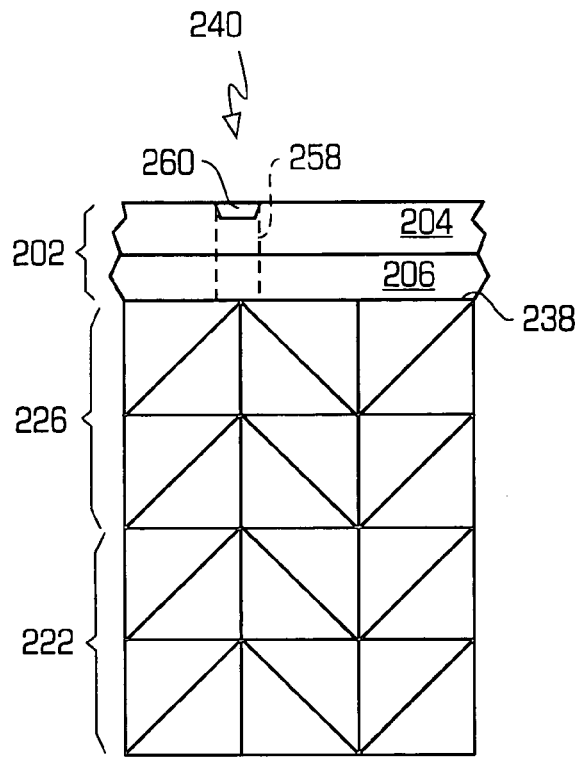
FIG. 9 shows one embodiment of the soil injection ports.

FIG. 9 shows one embodiment of the soil injection port 240, which includes a pipe 258 which extends though the hardscape 202 and into the upper water cell layer 226. A cap 260 may be used to prevent foreign matter from entering the pipe 258. In use, water, fertilizers, compost tea or other suitable materials, to treat or maintain the health of the roots is injected into the pipe 258. The materials then travel through the upper water cell layer 226 until they settle in the soil cell layer 222.

Figure 10:
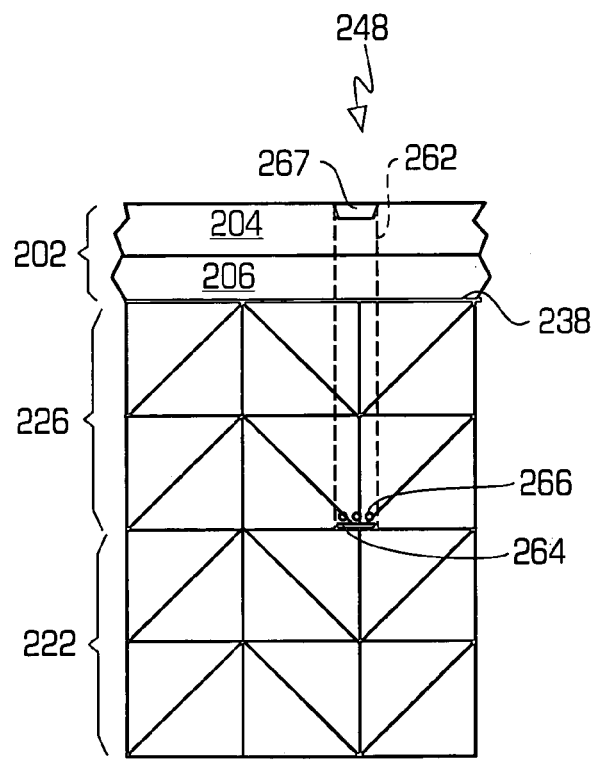
FIG. 10 shows one embodiment of the upper cell inspection and cleanout.

FIG. 10 shows one embodiment of the upper cell inspection and cleanout 248, which includes a riser pipe 262 that extends from and through the hardscape 202 and the upper water cell layer 226, ending with a riser pipe plug 264 proximate the soil cell layer 222. One or more water outflow holes 266 may be positioned near the lower end of the riser pipe 262. A cap 267 may be used to prevent foreign matter from entering the riser pipe 262. With the cap 267 removed, the upper cell inspection and cleanout 248 may be used to add water, remove or test water, or remove sediment from the upper water cell layer 226.

Figure 11:
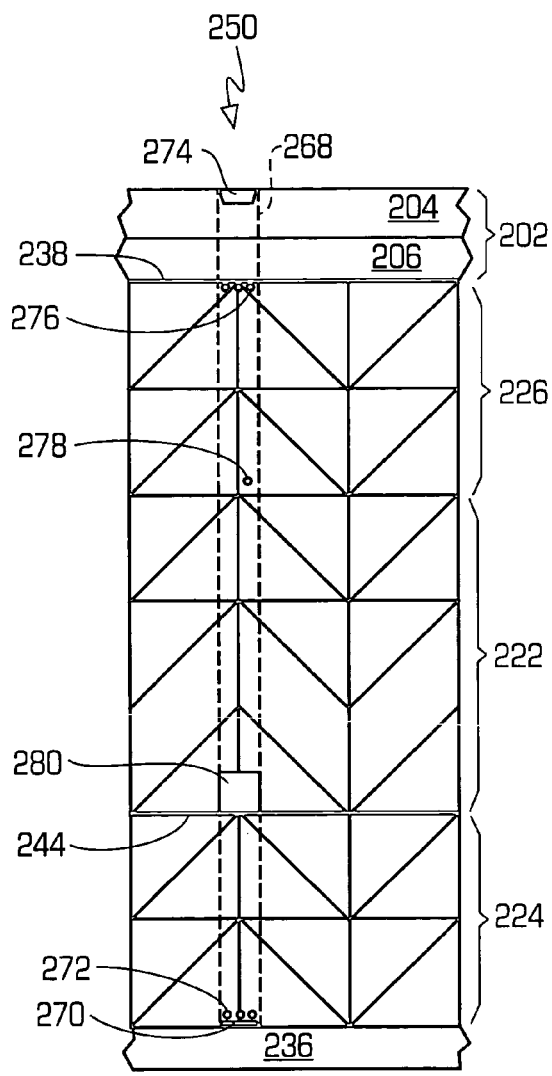
FIG. 11 shows one embodiment of the lower cell inspection, cleanout and bypass splitter.

FIG. 11 shows one embodiment of the lower cell inspection, cleanout and bypass splitter 250, which includes a riser pipe 268 that extends through the hardscape 202, the upper water cell layer 226, the soil cell layer 222 and into the lower water cell layer 224, ending with a riser pipe plug 270 proximate the gravel bed 236. One or more water outflow holes 272 may be positioned near the lower end of the riser pipe 268. A cap 274 may be used to prevent foreign matter from entering the riser pipe 268. With the cap 274 removed, the lower cell inspection, cleanout and bypass splitter 250 may be used to add water, remove or test water, or remove sediment from the lower water cell layer 224. Near a top portion of the upper water cell layer 226 may be one or more overflow holes 276 in the riser pipe 268 which allows transfer of some water from the upper portion of the water cell layer 226 to the lower water cell layer 224. If the water level in the upper water cell layer 226 rises too quickly, such as during a storm, and cannot be filtered through the soil cell layer 222, the overflow holes 276 allow some of the water to be transported directly from the upper water cell layer 226 to the lower water cell layer 224. One or more weep holes 278 may also be present in the riser pipe 268 to allow eventual draining of the upper cells and prevent stagnation of water. A geotextile riser seal 280 may also be used to seal the area between the soil cell layer 222 and the lower water cell layer 224 in the area of the riser pipe 268.

Figure 12:
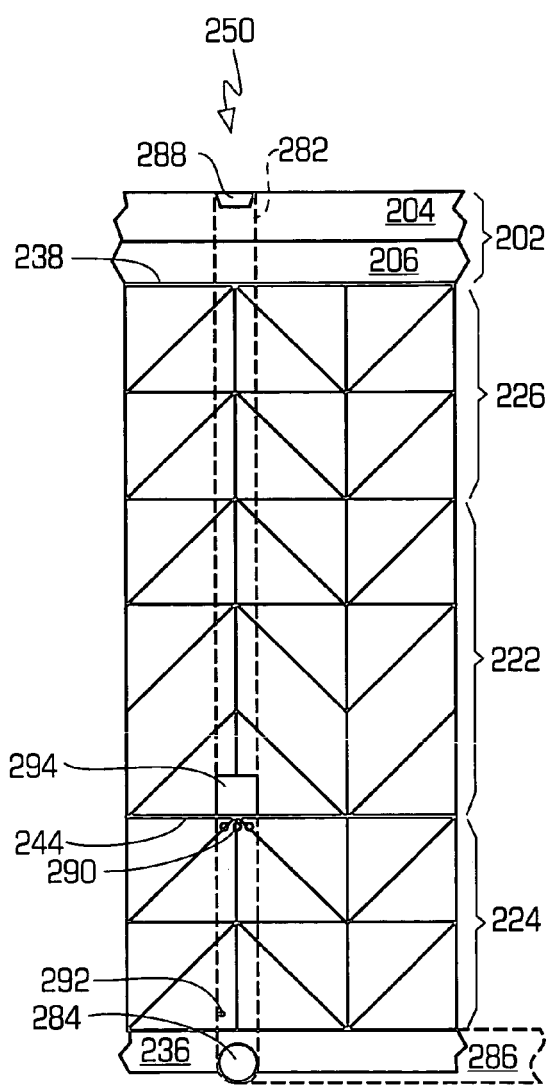
FIG. 12 shows one embodiment of the overflow pipe and inspection riser.

FIG. 12 shows one embodiment of the overflow pipe and inspection riser 250, which includes a riser pipe 282 that extends through the hardscape, the upper water cell layer 226, the soil cells 222 and the lower water cell layer 224, ending at an overflow pipe 284 proximate or in the gravel bed 236. The overflow pipe 284 may be connected to a storm drain 286 or to another drainage system. A cap 288 may be used to prevent foreign matter from entering the riser pipe 282. Near a top portion of the lower water cell layer 224 may be one or more overflow holes 290 in the riser pipe 282. If the water level in the lower water cell layer 224 rises too quickly, such as during a storm, and cannot be infiltrated into the surrounding gravel or soil, the overflow holes 290 allow some of the water to be transported from the lower water cell layer 224 to the pipe 284 connected to the storm drain 286. One or more weep holes 292 may also be present in the riser pipe 282 to allow eventual draining of the lower cells and prevent stagnation of water. A geotextile riser seal 294 may also be used to seal the area between the soil cell layer 222 and the lower water cell layer 224 in the area of the riser pipe 282.

Figure 13:
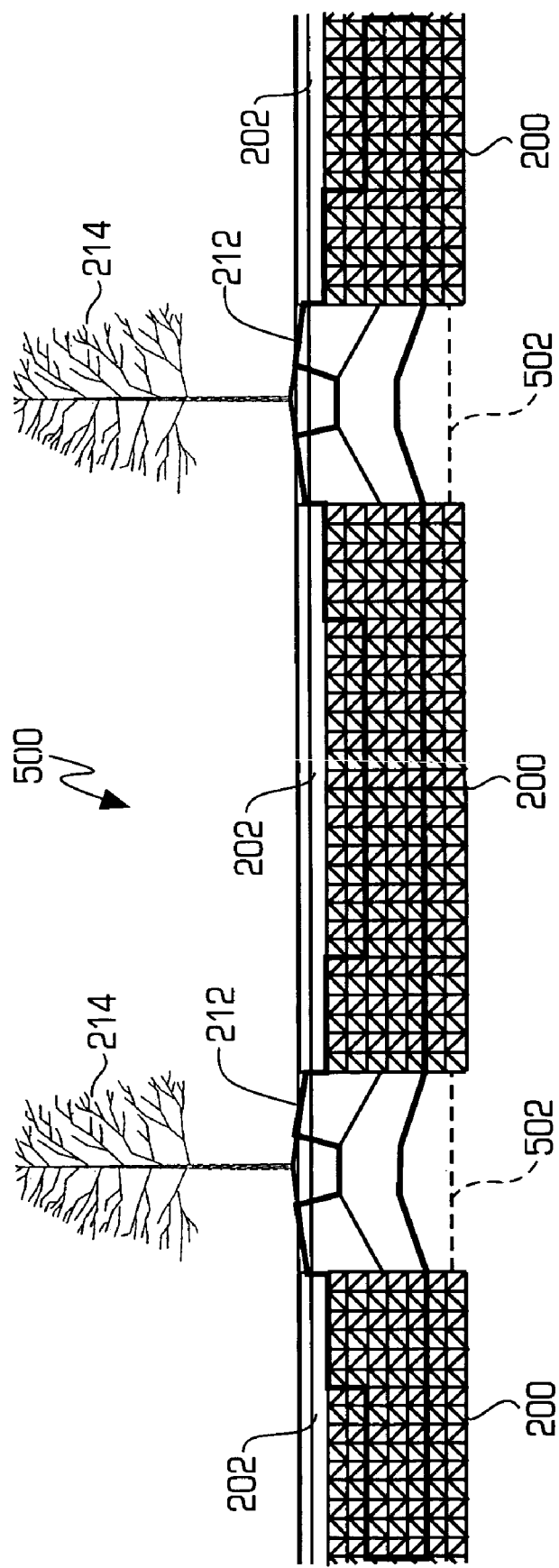
FIG. 13 shows one embodiment of the multiple integrated tree root and storm water systems.

The different functional parts of the invention may be utilized as independent parts and assembled in various modular configurations and combinations. FIG. 13 is a cross-sectional view showing an integrated tree root and storm water system 500 which combines many smaller integrated tree root and storm water systems 200 described above. The systems 200 are placed proximate openings 212 in the hardscape 202 into which trees 214 are planted. In some embodiments, there may be more than one systems 200 used for each tree 214, with the different systems 200 in fluid communication 502 with each other so that they may share water, oxygen, soil or nutrients. In other embodiments, one system 200 may be used with each tree 214, with the tree 214 being positioned near a center opening (similar to FIG. 2).

The system 500 may be sized for multiple size storm events. If the storm water volume exceeds the designed size or flow rate of one system 200, water will backup into it's inlets and continue to flow to the next inlet in the next system 200. The system 500 is not designed to be the terminal catchment without a large storm overflow, it is designed to be part of a series of treatment facilities (such as systems 200) that ends in an overflow outlet capable of receiving the required maximum storm event.

Figure 14:
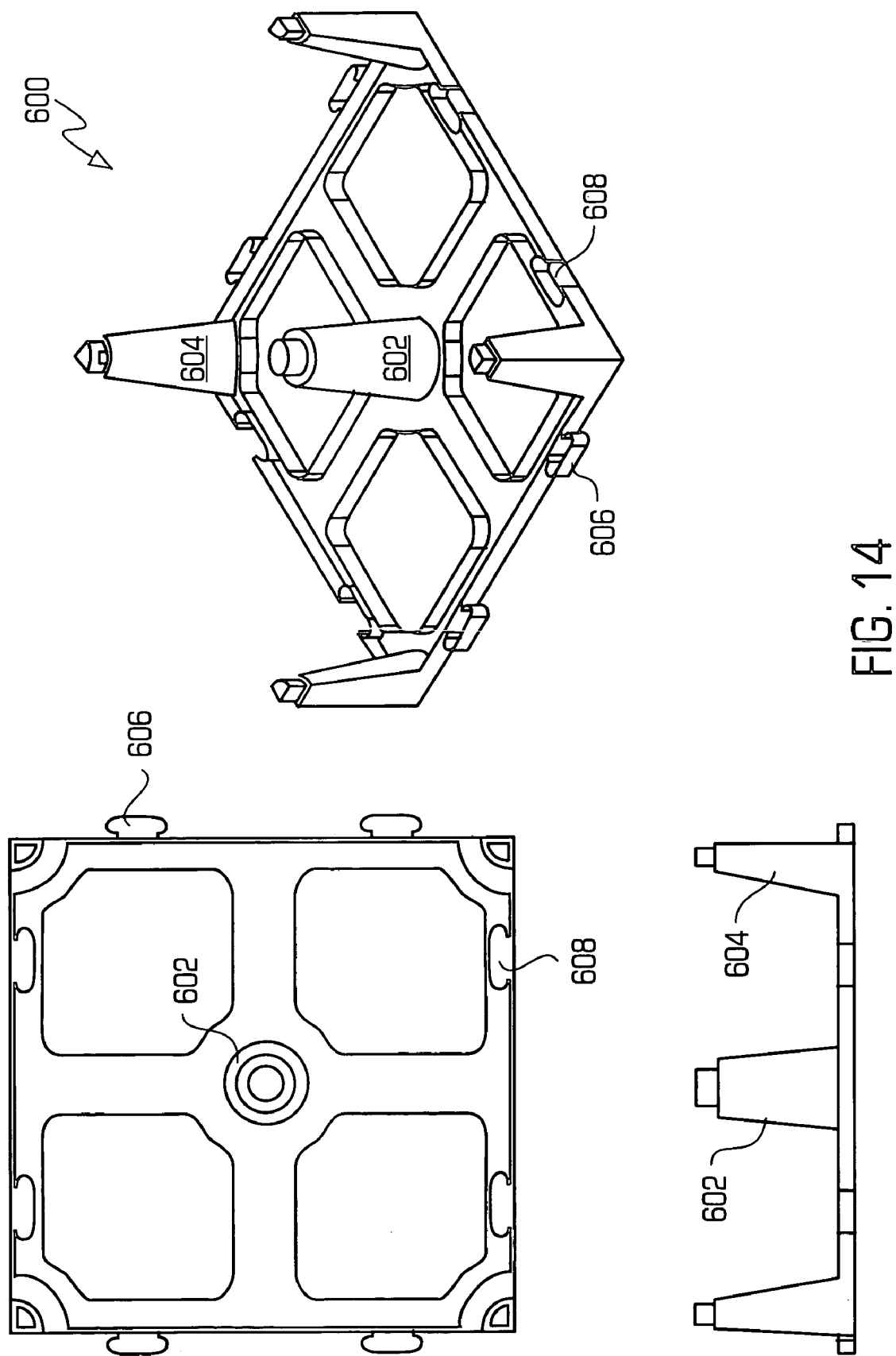
FIGS. 14, 15 and 16 show one embodiment of the structural cell for use in the system.
Figure 15:
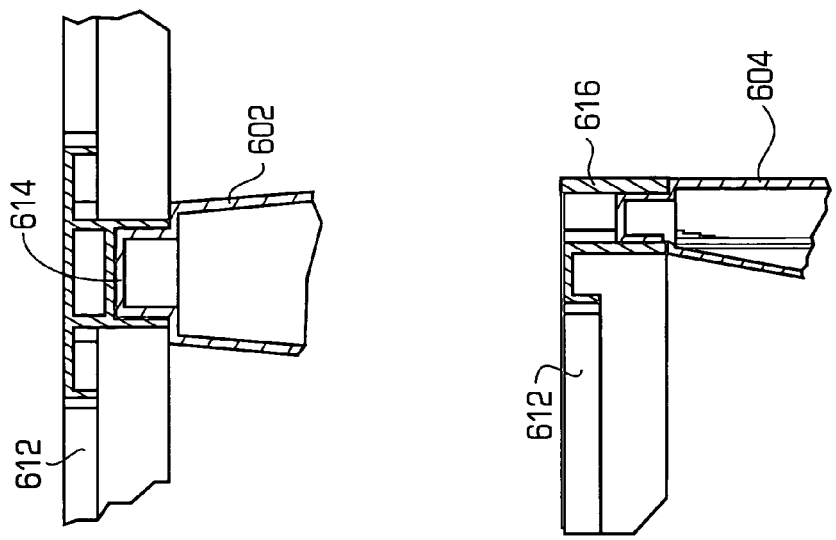
Figure 15:
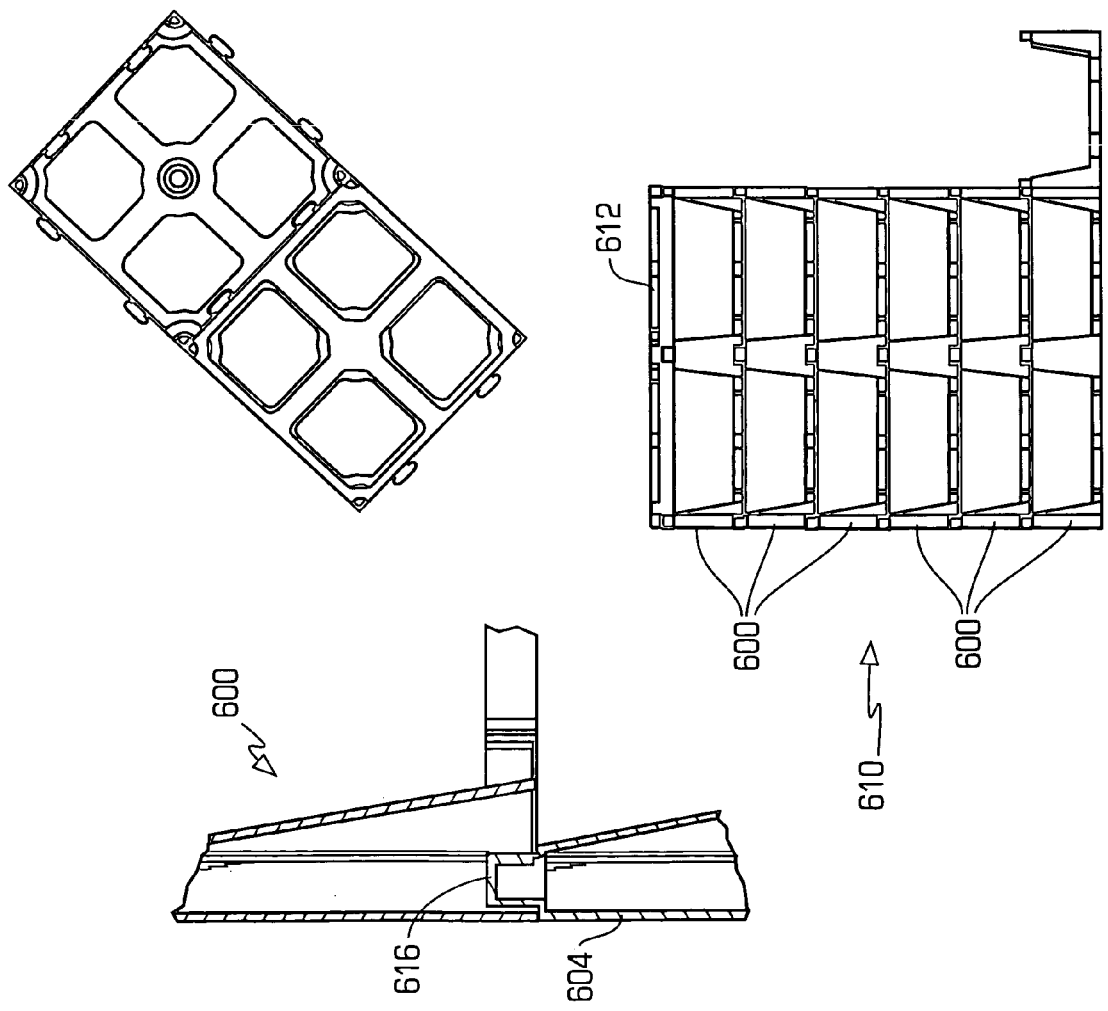
Figure 16:
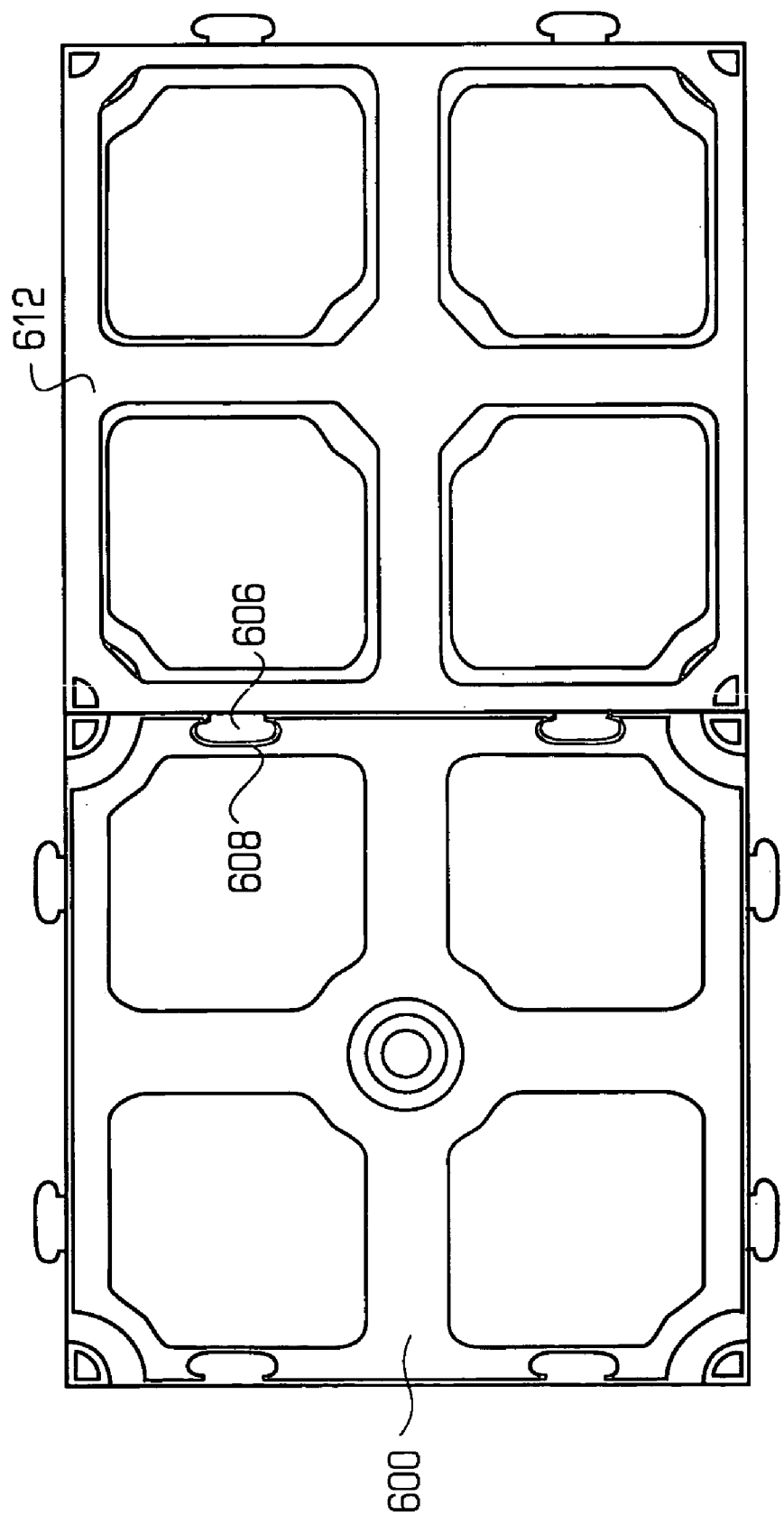

FIGS. 14, 15 and 16 show one embodiment of a structural cell 600 for use in an integrated tree root and storm water system described above. The structural cells 600 provide a consolidated set of functionality, coupling storm water management at the same time allowing tree roots to develop in the same environmental envelop. The structural cells 600 can be stacked and assembled in a load bearing orientation, and buried in a soil system promoting water drainage and tree root growth. A cap or top cell 612 may be used for the hardscape to be placed upon. The stacked grid or layers 610 of structural cells 600 and top 612 (see FIG. 15) must be able to withstand both live and dead loads, including heavy commercial vehicle traffic. The structural cell 600 is an open design to allow water, soil and/or roots to penetrate. The structural cell 600 may be made of plastic, composite, concrete or other suitable materials. In one embodiment, the structural cell 600 is injection molded from DuPont Zytel, 30% glass filled thermoplastic. The structural cell 600 and top 612 can be any suitable size. In one embodiment, the structural cell 600 has a 24"×24" base and is 8" high while the top 612 is 24"×24". The design of the structural cell 600 creates individual columns which are load bearing in the corners and in the center regions. In the embodiment shown the structural cell 600 includes a central support 602 and corner supports 604. The central and corner supports may be different shapes, such as square, rectangle or circular (shown). The supports may also be tapered. The corner supports 604 are design to work with adjacent structural cells. The structural cell 600 and top 612 also includes interlocking tabs 606 that nest into tab recesses 608 in adjacent structural cells 600 or top 612 when assembled (see FIG. 16). In the figures the corner supports 604 are a quarter circles, such that when the structural cells 600 are positioned in a pattern or grid, adjacent cell corner supports 604 create a circular support made up of four corner supports. There are nesting recesses 614 and 616 in the bottom of the structural cell 600 and top 612 sized to accept the central support 602 and corner supports 604 of the structural cell 600 below it creating a self locking feature both horizontally and vertically. The volume of the structural cell 600 shown in the figures has an available volume of between 85%–95% that can be filled with loam soil that supports root growth.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes that come within the meaning and range of equivalency of the claims are intended to be embraced therein.

What is claimed is:

1. A multilayered structural cell system for supporting hardscape areas that enables tree root growth and accommodates filtering, retention, storage and infiltration of storm water while preventing hardscape damage, comprising;
   a first layer of structural cells positionable below the hardscape, the first layer of structural cells are short term water storage cells;
   water ingress into the first layer;
   a second layer of structural cells positioned below the first layer, and including tree-rooting medium supporting the normal growth of structural roots within the second layer of structural cells; wherein tree-roots penetrate the second layer through openings in the structural cells sized to accept the tree roots from a tree external to the structural cells;
   a third layer of structural cells positioned below the second layer, the third layer of structural cells are long term water storage cells;
   water egress from the third layer of structural cells;
   a first permeable barrier separating the first and second layers;

a second permeable barrier separating the second and third layers; and each of the layers being in fluid communication with the other layers.

2. The system of claim 1, wherein the tree-rooting medium is configured to filter the storm water between the first layer and the third layer.

3. The system of claim 1, further comprising a barrier positioned between the first layer and the hardscape.

4. The system of claim 1, wherein the hardscape may be sidewalk, parking or roadway pavement.

5. The system of claim 1, further comprising one or more water wicks between layers.

6. The system of claim 1, further comprising a soil injection port through the hardscape.

7. The system of claim 1, further comprising cell inspection port through the hardscape.

8. The system of claim 1, further comprising a flushing cleanout port.

9. The system of claim 1, further comprising one or more permeable barriers positioned between the first layer of structural cells and the hardscape.

10. The system of claim 1, further comprising one or more permeable barriers positioned between the first, second and/or third layers of structural cells and the surrounding soil.

11. The system of claim 1, wherein the structural cells are disposed in a vertical configuration.

12. The system of claim 1, wherein the structural cells are disposed in a corbel configuration.

13. The system of claim 1, further comprising one or more water wicks.

14. The system of claim 1, wherein the water ingress means is a storm drain inlet.

15. The system of claim 1, wherein the storm drain inlet includes a filter.

16. The system of claim 1, wherein the water ingress is through permeable hardscape.

17. The system of claim 1, wherein water egress is water infiltration into surrounding soil.

18. The system of claim 1, wherein water egress is a storm drain.

19. The system of claim 1, further comprising a splitter system allowing some water to pass directly from the first layer to the third layer.

20. The system of claim 1, further comprising one or more weep holes to allow draining.

21. The system of claim 1, further comprising means for flushing the system with water.

* * * * *